(12) United States Patent
Blumenschein et al.

(10) Patent No.: US 6,687,337 B2
(45) Date of Patent: *Feb. 3, 2004

(54) METHOD AND SYSTEM FOR TERMINATION BLOCKING OF MESSAGE DELIVERY SERVICE

(75) Inventors: Gordon Lynn Blumenschein, Woodridge, IL (US); Jeffrey James Meek, Lake in the Hills, IL (US); Susanne Marie Crockett, Buffalo Grove, IL (US)

(73) Assignee: SBC Properties, L.P., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/161,050

(22) Filed: May 31, 2002

(65) Prior Publication Data

US 2002/0196909 A1 Dec. 26, 2002

Related U.S. Application Data

(63) Continuation of application No. 09/239,232, filed on Jan. 28, 1999, now Pat. No. 6,424,702.

(51) Int. Cl.[7] .............................. H04M 1/64; H04M 3/42
(52) U.S. Cl. ................ 379/67.1; 379/88.12; 379/88.17; 379/88.19; 379/88.22; 379/142.02; 379/142.05; 379/210.02; 379/210.03
(58) Field of Search ........................... 379/67.1, 70, 71, 379/72, 76, 88.04, 88.12, 88.17, 88.18, 88.22, 88.25, 265.01, 266.01, 266.07, 266.08, 88.19, 142.02, 88.2, 142.05, 210.02, 210.03

(56) References Cited

U.S. PATENT DOCUMENTS

| | | | |
|---|---|---|---|
| 4,766,604 A | 8/1988 | Axberg | 379/88.23 |
| 4,825,460 A | 4/1989 | Carter et al. | 379/88.26 |
| 4,901,341 A | 2/1990 | Carter et al. | 379/88.24 |
| 4,972,461 A | 11/1990 | Brown et al. | 379/88.06 |
| 5,036,533 A | 7/1991 | Carter et al. | 455/413 |
| 5,161,181 A | 11/1992 | Zwick | 379/67 |
| 5,333,180 A | 7/1994 | Brown et al. | 379/88.06 |
| 5,381,465 A | 1/1995 | Carter et al. | 379/88.26 |
| 5,467,388 A | 11/1995 | Redd, Jr. et al. | 379/142 |
| 5,497,414 A | 3/1996 | Bartholomew | 379/196 |
| 5,533,106 A | 7/1996 | Blumhardt | 379/142 |
| 5,583,920 A | 12/1996 | Wheeler, Jr. | 379/88 |
| 5,646,980 A | 7/1997 | Carter et al. | 379/88.25 |
| 5,694,456 A | 12/1997 | Carter et al. | 379/67.1 |
| 5,729,599 A | 3/1998 | Plomondon et al. | 379/211 |
| 5,768,348 A | 6/1998 | Solomon et al. | 379/67.1 |
| 5,832,072 A | 11/1998 | Rozenblit | 379/246 |
| 5,982,858 A | 11/1999 | Carter et al. | 379/88.26 |
| 6,055,513 A * | 4/2000 | Katz et al. | 705/26 |
| 6,069,890 A | 5/2000 | White et al. | 370/352 |
| 6,215,858 B1 | 4/2001 | Bartholomew et al. | 379/88.17 |
| 6,424,702 B1 * | 7/2002 | Blumenschein et al. | 379/67.1 |

* cited by examiner

Primary Examiner—Allan Hoosain
(74) Attorney, Agent, or Firm—Brinks Hofer Gilson & Lione

(57) ABSTRACT

A method (20) and system (50) is provided that permits a telephone caller to leave a message for a called party that does not have a conventional answering service, such as voice mail, an answering machine, a third-party operator-assisted answering service, or the like. A configurable blocking mechanism is also provided, permitting parties to prevent the message delivery service from being offered to callers attempting to reach them. The method (20) and system (50) can be implemented using an advanced intelligent network (AIN). In an AIN environment, the blocking mechanism can include a switch control point (SCP) (58) configured to access a termination blocking list (60). The termination blocking list (60) can be an SCP database file containing entries representing called parties who have blocked the message delivery service.

20 Claims, 7 Drawing Sheets

METHOD AND SYSTEM FOR TERMINATION BLOCKING OF MESSAGE DELIVERY SERVICE

This is continuation of application Ser. No. 09/239,232 filed Jan. 28, 1999 now U.S. Pat. No. 6,424,702.

TECHNICAL FIELD OF THE INVENTION

The present invention relates generally to telecommunications, and in particular, to messaging services in a telephone system.

BACKGROUND OF THE INVENTION

Convenience continues to be a predominant trend in today's society. With answering machines, voice mail and other messaging services becoming increasingly common, many callers find it frustrating to receive no answer. This situation arises when a caller attempts to reach a party that does not have an answering machine, voice mail or any other messaging service. Accordingly, there is a need for a message delivery service that enables a caller to benefit from the convenience of being able to leave a message even when the called party does not have a system automatically answering their phone. However, such a service should allow for called parties who insist on not receiving telephonic messages, to block the service, preventing messages from being delivered to their extension(s).

BRIEF DESCRIPTION OF THE DRAWINGS

The invention is pointed out with particularity in the appended claims. However, other features of the invention will become more apparent, and the invention will be best understood by referring to the following detailed description in conjunction with the accompanying drawings, in which:

DETAILED DESCRIPTION

The present invention relates to an improved message delivery service that records a caller's message for subsequent delivery to a called party. The service includes, among other things, a blocking mechanism that can be configured at the request of the called party to prevent activation of the message delivery service. This feature is advantageous in that it provides subscribers the option of not receiving incoming calls from an automated message delivery system.

According to one embodiment of the present invention, an advanced intelligent network (AIN) is configured to provide a selectively-enableable message service for delivering caller information to a called party subsequent to an originating call. The messaging service is capable of collecting and recording the caller information during the originating call and then placing one or more calls to the called party at successive intervals to deliver the caller information.

A blocking mechanism permits the called party to disable the messaging service so that it is not made available to the caller during the originating call. The blocking mechanism can be included in any of the elements of the AIN, or alternatively, it can be provided as a separate device, such as a conventional central office switch or communication serve connected thereto, operating in conjunction with the AIN.

Figure 1:
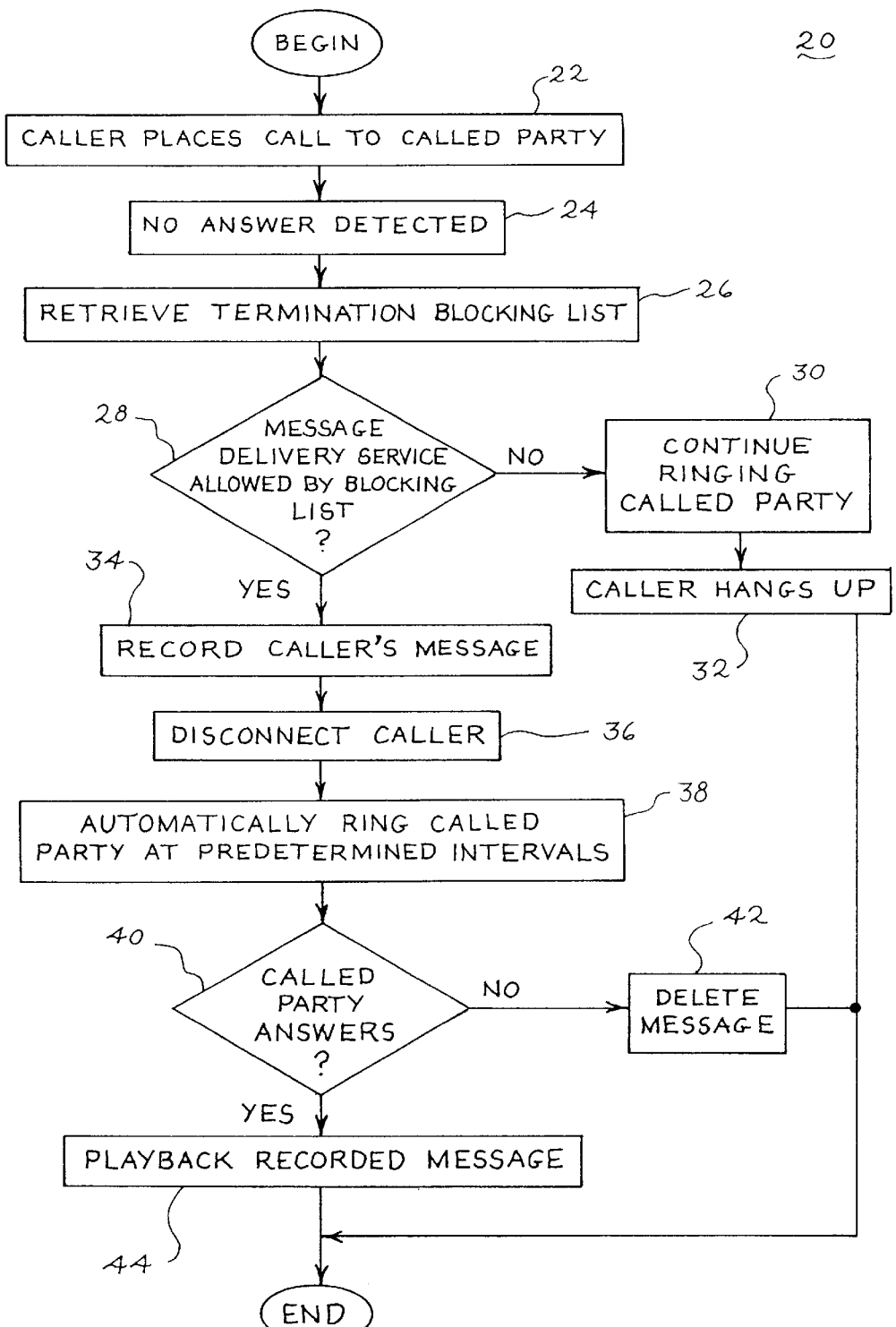
FIG. 1 shows a flowchart illustrating a method of operating a message delivery service in accordance with an embodiment of the present invention.

Turning now to the drawings, and in particular to FIG. 1, there is illustrated a flowchart diagram describing the operation of a message delivery service in a telecommunications system that accords with an embodiment of the present invention. In step 22, a caller places a call to the called party. Upon detecting a no-answer condition (step 24), a termination blocking list is accessed (step 26). A no-answer condition exists when a call has rung for a predetermined time without the called party answering. The termination blocking list can be a database file included in the blocking mechanism. The list can include caller-IDs, the names, numbers, or any other type of information for identifying called parties that do not wish to receive messages generated by the delivery service.

Accordingly, while the call is in progress, a check is made to determine whether or not the called party is included in the termination blocking list (step 28). If the called party is identified in the list, the message delivery service is blocked, i.e., it is not offered to the calling party. In this circumstance, the call simply continues ringing the called party, without the service being offered (step 30) until the caller hangs up (step 32) or the call is otherwise terminated. However, if the called party is not identified by the blocking list, the delivery service provides the caller the option of recording a message (step 34).

If the caller selects the service, a message is recorded and stored. After the message is recorded, the caller is disconnected (step 36). The service then automatically places one or more calls to the called party at predetermined intervals (step 38) to deliver the message. During each call, a check is made to determine whether the called party answers (step 40). If the party answers, the recorded message is played back (step 44). However, if after a predetermined number of attempts, the called party fails to answer the calls placed by the messaging service, the service deletes the stored message (step 42).

Figure 2:
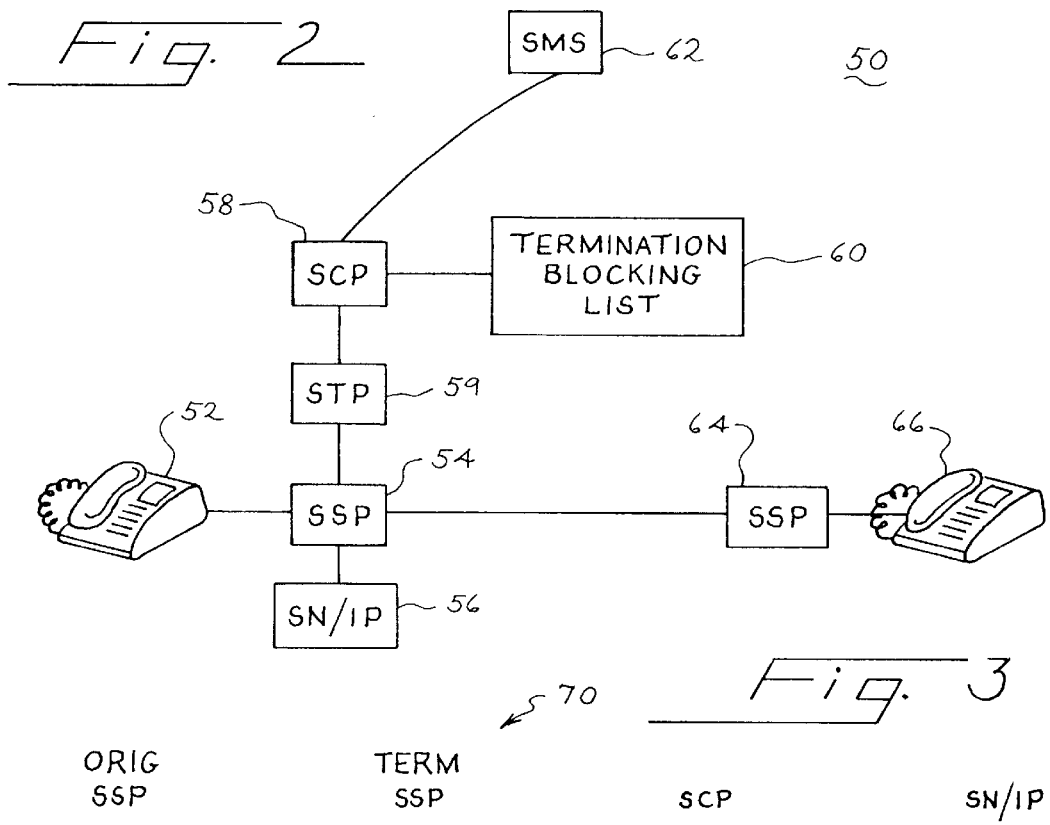
FIG. 2 is a block diagram illustrating a telecommunications system in accordance with an exemplary embodiment of the present invention.

Turning now to FIG. 2, there is illustrated a telecommunications system 50 providing an exemplary embodiment that accords with the present invention. The system 50 can include an advanced intelligent network (AIN) including an originating service switching point (SSP) 54, an originating service control point (SCP) 58, a service node/intelligent peripheral (SN/IP) 56, a termination blocking list 60, a signal transfer point (STP) 59, a service management system (SMS) 62, and a termination SSP 64. A caller customer premises equipment (CPE) 52, such as a telephone or the like, can communicate with the originating SSP 54, using any suitable interface, including a local loop, conventional analog, or alternatively, a digital communication link, such as an integrated service digital network (ISDN) interface. A called party CPE 66 such as a telephone or the like, communicates with the termination SSP 64 using a suitable interface, such as those listed above for the caller CPE 52.

The AIN architecture can be implemented with common channel Signalling System No. 7 (SS7) protocol. An SS7 network includes various packet switching elements and transmission links, some of which are shown in the system 50. For instance, the SMS 62 generally includes a computer-based system used to design service logic, to control logic implementation on the system 50, and to manage system operation, such as monitoring traffic levels, collecting statistics and billing data, and providing a mechanism for updating the AIN according to subscriber service orders. Although not so limited, the SMS 62 can be implemented by a computer workstation, such as an HP9000 from Hewlett-Packard, running commercially available SMS software.

The SCP 58 can be a commercially-available AIN node which contains the service logic and associated data support to execute the required customer services. For example, the SCP 58 can be implemented using an SCP Model 1 or Model 2, available from Lucent Technologies, Inc.

As is known in the art, the STP 59 can be a packet switch used to route signalling messages within the network.

The SSPs 54, 64 can be commercially-available AIN nodes used as local or central office switches sometimes also referred to as an end-office, which recognize "triggers" generated when a call invokes an AIN service. As is known in the art, standard triggers are provided with commercially-available SSPs, as well as proprietary triggers that are available with and well documented for specific SSPs. Generally, upon detecting a trigger, an SSP communicates with its SCP to operate the invoked service.

The functionality of the originating and termination SSPs 54, 64 as disclosed herein can be implemented using a 5ESS switch, with generic 5E11 update or better, available from Lucent Technologies, Inc.

The termination blocking list 60 can be a database file containing information (such as a party's name and number), for identifying parties that do not want the messaging service to deliver information to them. If a party has entered into the termination blocking list 60, the messaging service will be blocked, and the caller will not be given the option to invoke the service. The termination blocking list 60 can be updated to include or delete a party's entry therein. This can be accomplished by the party submitting a service order to the SMS 62, which in turn, sends a message to the SCP 58 causing a service logic thereof to modify the termination blocking list. The SMS 62 can include a standard software interface configured to permit an operator to manually enter a service request generated by a party to create a service order.

The SN/IP 56 can be a computer or communication server linked via an open interface to the originating SSP 54. In the example shown, the SSP 54 and the SN/IP 56 communicate via an integrated services digital network (ISDN) connection. The ISDN link can be implemented using either ISDN-BRI (basic rate interface) or ISDN-PRI (primary rate interface) protocols, which are known in the art.

It is not necessary to have SN/IP 56 directly connected to the originating SSP 54. The SN/IP 56 can be alternatively connected to another SSP or an end office (EO) (not shown) that is in communication with the originating SSP 54. In this arrangement, calls are connected to the SN/IP by routing them through the other SSP or EO hosting the SN/IP.

The SN/IP 56 contains and manages resources required to offer services and service enhancements to network users. Generally, the SN/IP 56 may be used to combine advanced speech technologies and computer telephony integration (CTI) capabilities in a single platform that can be used as a network resource. The services provided by the SN/IP 24 can include voice or fax store and forward, dual-tone multi-frequency (DTMF) recognition with external telephony resources, text-to-speech synthesis, and the like. A compact service node (CSN) as manufactured by Lucent Technologies, Inc., can be used to provide the functionalities of the SN/IP 56 disclosed herein.

Figure 3:
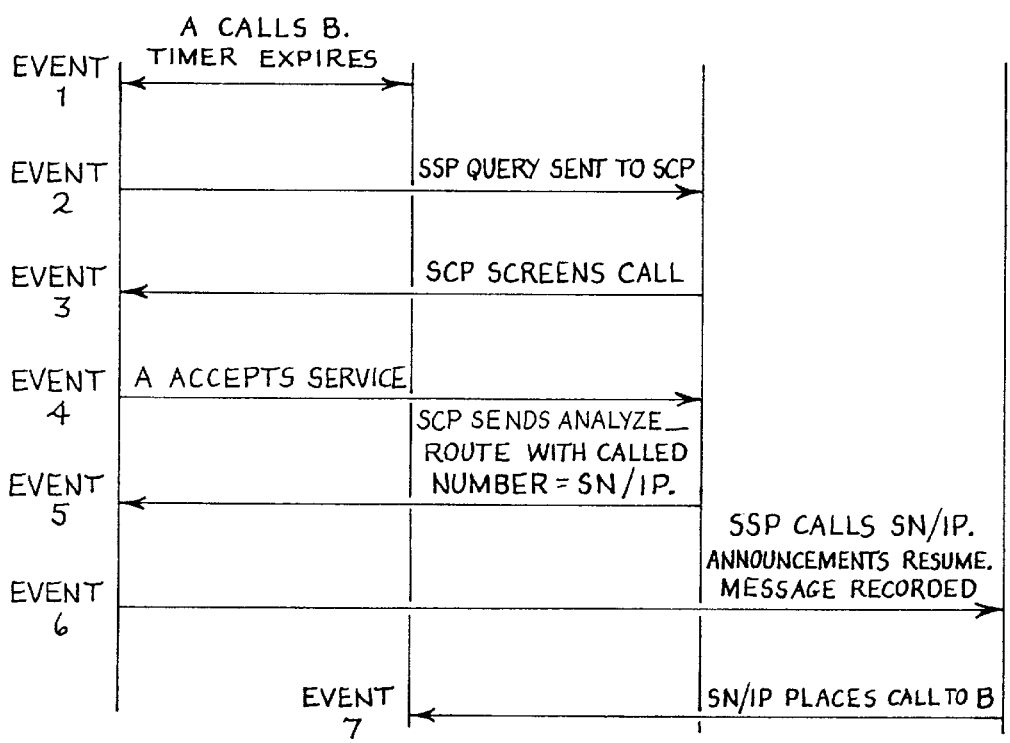
FIG. 3 shows an event diagram depicting caller invocation of the message delivery service available from the system of FIG. 2.

FIG. 3 shows an event diagram 70 depicting the invocation of the message delivery service in the AIN of FIG. 2. Initially, the calling party (party A) calls the called party (party B) (Event 1). The call is placed from the caller unit 52, and received by the originating SSP 54, which routes the call to the termination SSP 64. After connecting the call, a no-answer office trigger is generated by the originating SSP 54 upon party B's failure to answer after a predetermined, programmable interval has elapsed. The originating SSP 54 includes a timer (not shown) for determining elapsed time. Upon detecting the no-answer trigger, the originating SSP 54 queries the SCP 58. The query can be sent to the SCP 58 using a conventional SS7 protocol. In response to the query, the SCP 58 screens the call to determine whether the message delivery service is available to party A. The screening is accomplished by comparing caller information and/or called party information to predetermined criteria, such as lists of restricted prefixes, non-LATA callers, and the like. The caller/called party information can be provided with the query message. If the service is available, the SCP 58 notifies the SSP 54, causing the SSP 54 to generate an announcement to party A offering the message delivery service.

Party A's response to this offer is passed from the SSP 54 to the SCP 58, which then determines whether or not party A has selected to deliver a message. If party A has selected the service, the SCP 58 sends an analyze-route message to the SSP 54, where the analyze route message includes a called number parameter sent to the number of the SN/IP 56. Upon receiving the analyze-route message, the SSP 54 connects the call SN/IP 56, which can play a series of announcements to party A and collect and record caller information. The caller information can include the caller's name and phone number. After the call has terminated, the SN/IP 56 places successive calls to party B via the termination SSP 64 until the party B answers or a predetermined maximum number of attempts is exceeded. If party B answers any of these calls, the recorded message is delivered by playing it back to party B.

Figure 4:
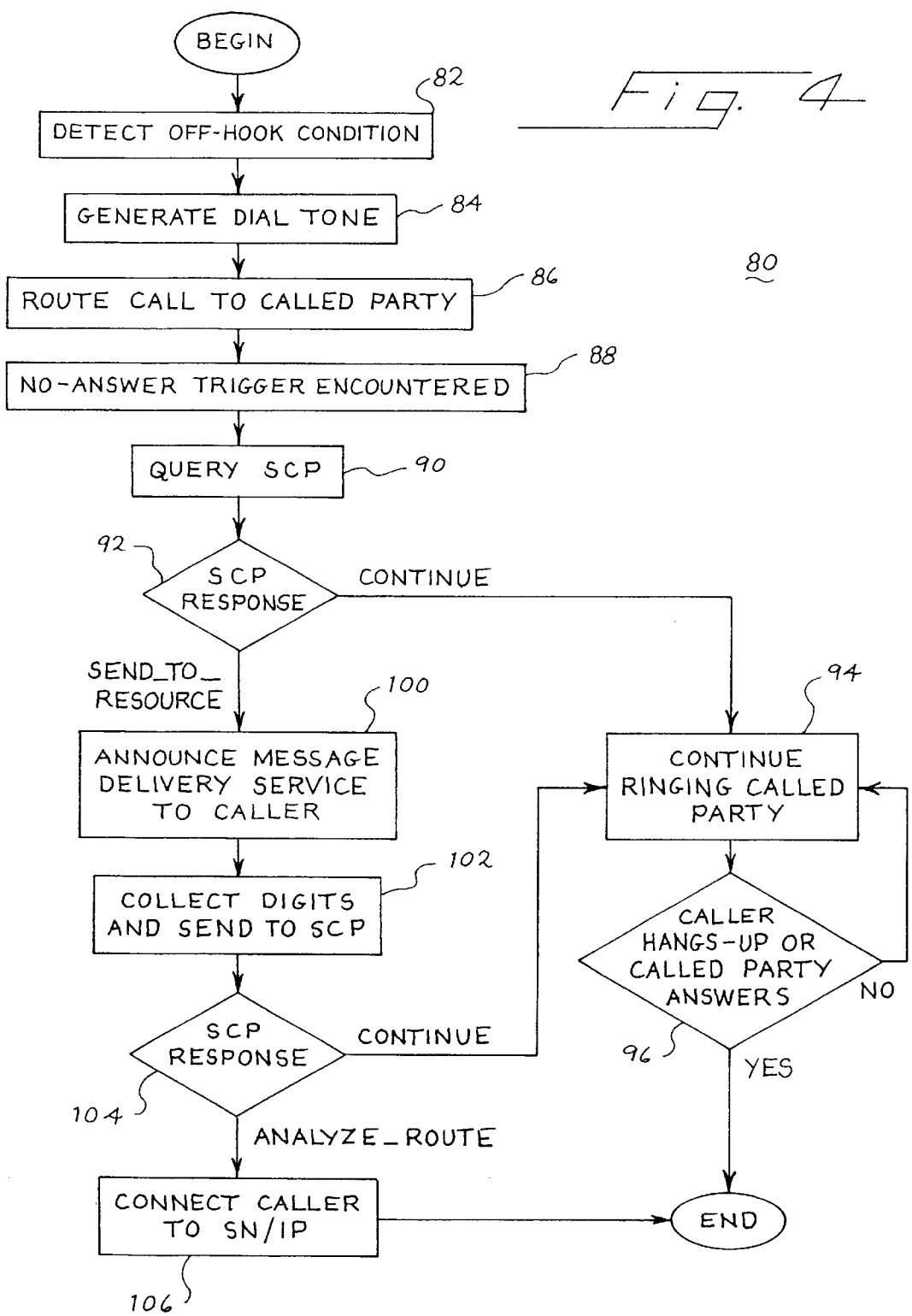
FIG. 4 shows a flowchart diagram illustrating the operation of the originating service switching point (SSP) of FIG. 2 in accordance with an embodiment of the invention.

FIG. 4 shows a flowchart diagram of a method 80 of operating the originating SSP 54 shown in FIG. 2. In step 82, the SSP 54 detects an off-hook condition generated by the caller CPE 52. In response to the off-hook condition, the SSP 54 provides a dial tone (step 84) to the caller CPE 52. After receiving a dialed number, the SSP 54 routes the call to the called parties premise equipment 66 (step 86). After the call has been allowed to ring for a predetermined time without answer, a no-answer trigger is encountered by the SSP 54 (step 88). In response to the no-answer trigger, the SSP 54 transmits a no-answer query to the SCP 58 (step 90). The no-answer query can include caller and called party's information. The SCP 58 then screens the call according to predetermined criteria and then provides a response to the SSP 54. Details of the screening criteria are provided below with reference to FIGS. 5–7. Referring back to FIG. 4, in step 92, the SSP 54 receives the SCP response. If the SCP 58 responds with a continue message, the messaging service is not invoked and the SSP 54 continues ringing the called party (step 94) until the caller hangs up or the called party answers (step 96).

However, if the SCP 58 transmits a send-to-resource message to the SSP 54, the messaging service will be offered to the called party. In this case, the SSP 54 plays an announcement to the caller giving the caller the option to select the messaging service (step 100). In step 102, the SSP 54 collects the digits entered by the caller in response to the announcement and sends them to the SCP 58 to be analyzed. The SCP 58 compares the caller digits to predetermined criteria to determine whether the caller has selected the service. If the caller selects the service, the SCP transmits an analyze-route message to the SSP 54; otherwise, if the caller has not selected the service, the SCP 58 transmits a continue message (step 104). If the SSP 54 receives the continue message, the service is not offered and the SSP 54 continues to ring the called party (step 94) until the caller hangs up or the called party answers (step 96). However, upon receiving an analyze-route message, the SSP 54 attempts to connect the caller to SN/IP 56 (step 106).

Figure 5:
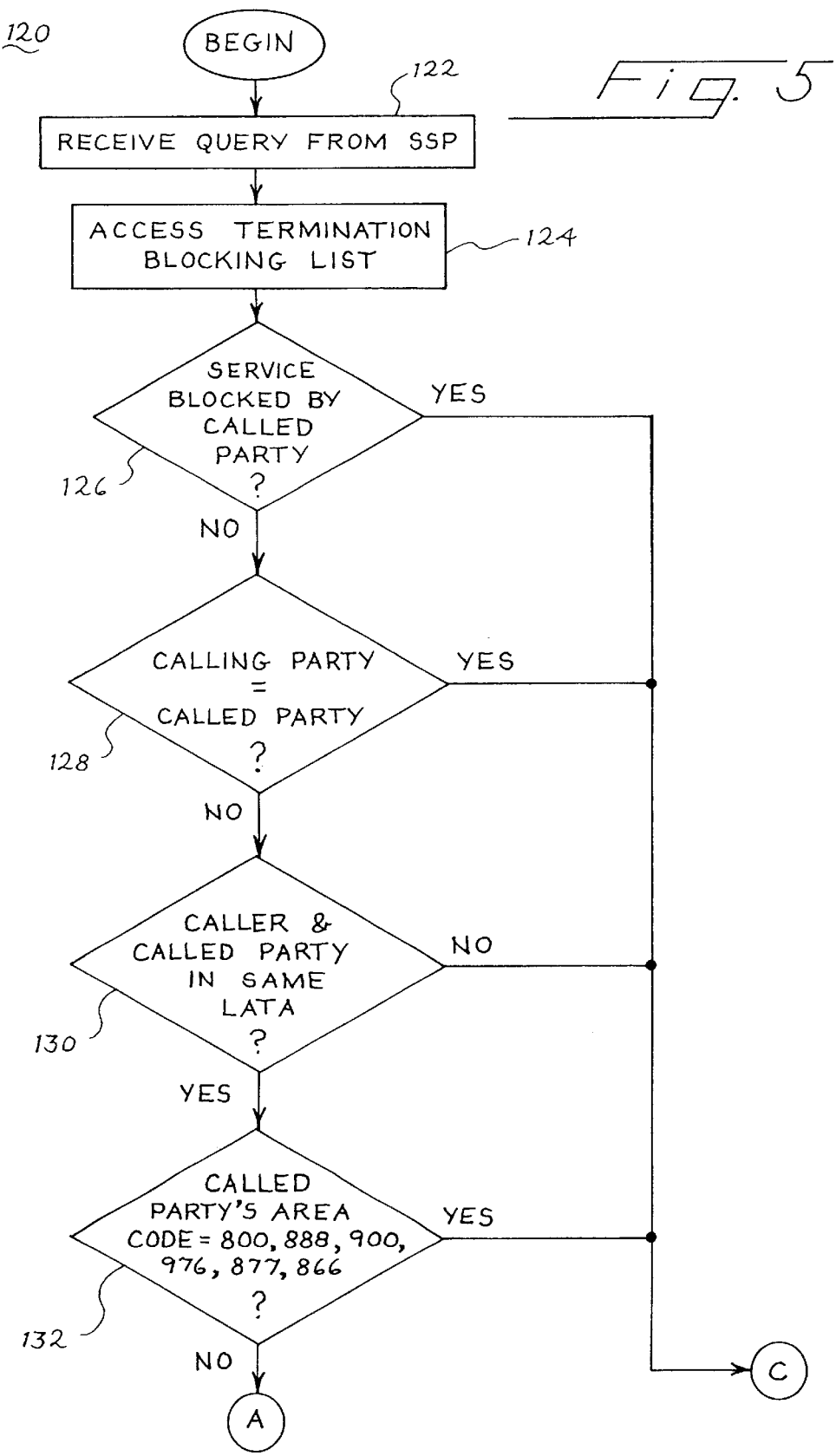
FIGS. 5–7 show a flowchart diagram illustrating a method of operating the originating service control point (SCP) of FIG. 2 in accordance with an embodiment of the present invention.
Figure 6:
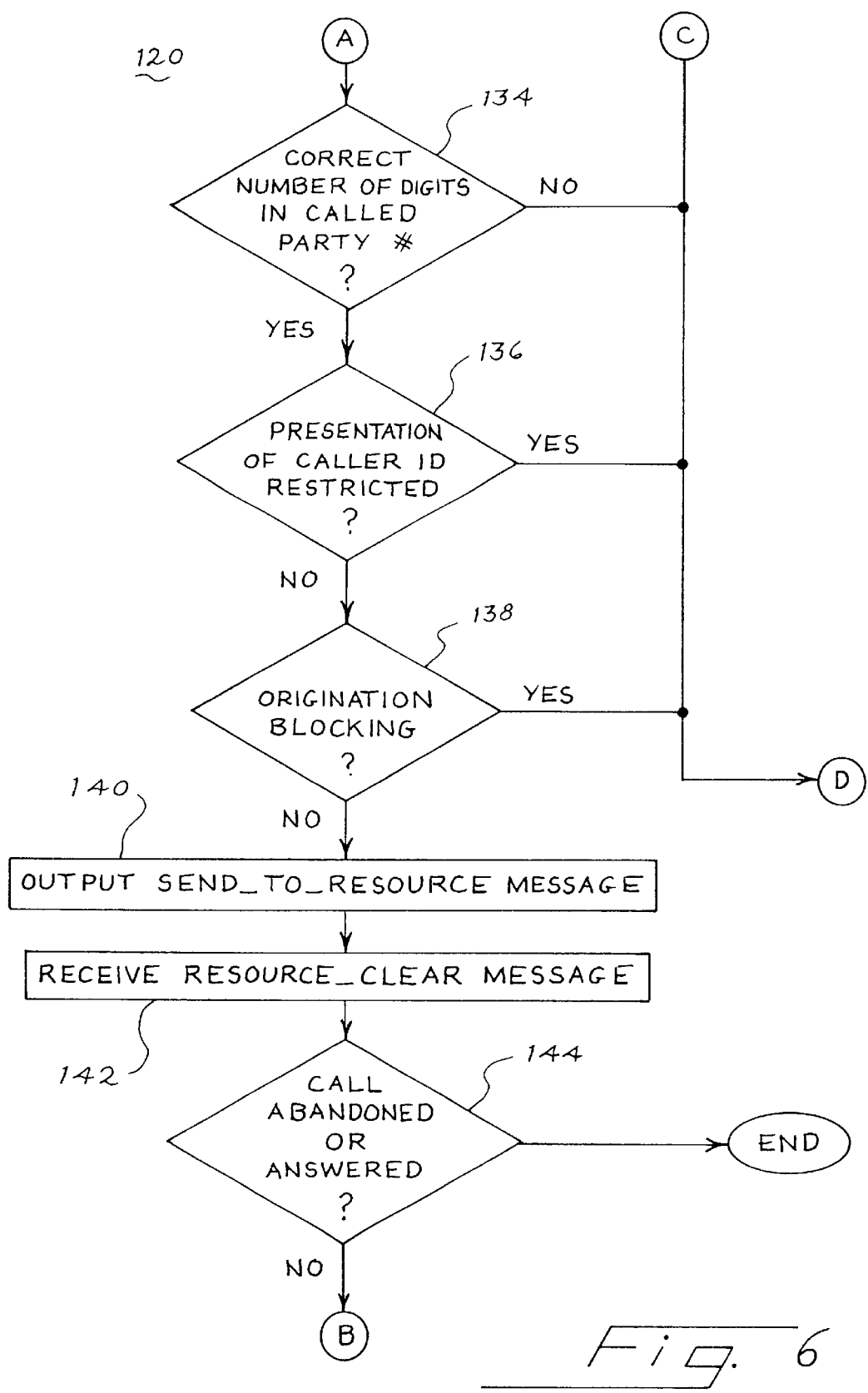
Figure 7:
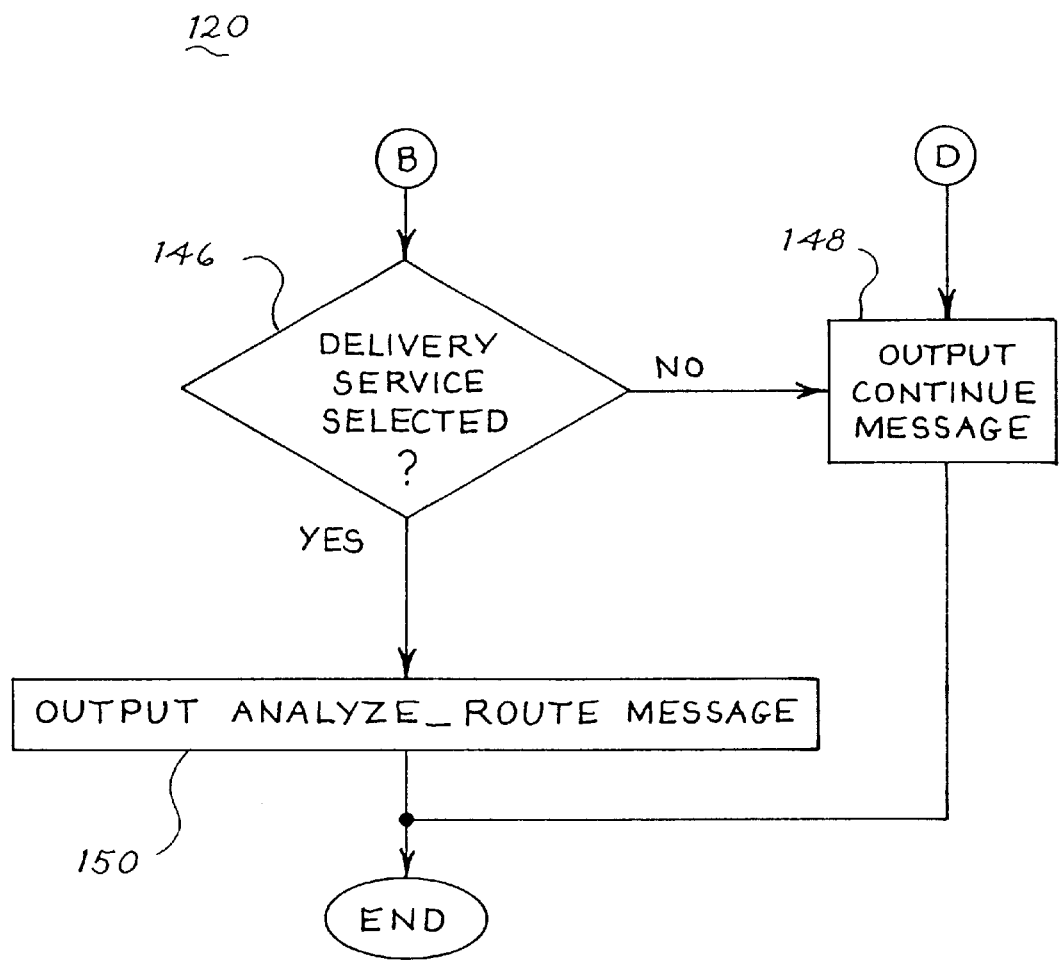

FIGS. 5–7 show a flowchart illustrating a method 120 of operating the originating SCP 58 shown in FIG. 2. The primary functions of the SCP 58 are to control the service and to screen the calls by comparing incoming caller/called party information to the predetermined criteria. To provide the message delivery service, the SCP 58 communicates with the SSP 54 and provides control information for successfully routing the originating call. To provide the message delivery service, operation of the SCP 58 commences upon receiving a no-answer query from the SSP 54 (step 122). Upon receiving this query, the SCP 58 accesses the termination blocking list 60 (step 124). As described above, the termination blocking list 60 can be a database file containing information for identifying parties that do not want the messaging service to deliver caller information to them.

After accessing the termination blocking list 60, the SCP 58 determines whether the message delivery service has been blocked by the called party (step 126). If so, the SCP 58 outputs a continue message to the SSP 54, causing the SSP 54 to continue ringing the called party without offering the service. However, if the service is not blocked by the termination blocking list, the method 120 proceeds to step 128.

The remaining screening criteria discussed in reference to steps 128–138 are not exhaustive, representing examples of possible criteria that can be used in conjunction with the termination blocking list 60. In step 128, a check is made to determine whether the identity of the calling party is equal to that of the called party. If so, the SCP 58 generates the continue message step 148 and the service is not offered. Otherwise, the SCP 58 continues its screening process by comparing the call to additional criteria. In step 130, a check is made to determine whether the caller and the called party reside within the same local access and transport area (LATA). If not, the SCP 58 outputs a continue message to the SSP 54. Otherwise, the method proceeds to step 132, where the area code of the called party is checked to determine whether it is restricted from using the messaging service. A list of excluded area codes can include toll-free numbers, such as 800 and 888 numbers, as well as toll numbers, such as 900 and 976 area codes. The SCP 58 can be configured to prohibit the message delivery service from any predetermined area code.

Next, in step 134 a check is made to determine whether or not the called party phone number includes the correct number of digits. For example, the correct number of digits in a phone number is typically ten or seven. If the correct number of digits is not present, the SCP 58 generates a continue message and the service is not offered (step 148). Otherwise, the SCP 58 continues its comparisons and determines whether the called party's caller-ID has been blocked, restricting presentation thereof (step 136). If so, the message delivery service is not offered and the SCP 58 generates a continue message (step 148). Next, in step 138 the SCP 58 checks an origination blocking list to determine whether or not the caller is prohibited from accessing the message delivery service. The origination blocking list can have a function analogous to that of the termination blocking list, in that it prevents the message delivery service from being offered to predetermined callers. However, the two blocking lists differ in that the origination blocking list contains entries identifying calling parties, while the termination blocking list contains entries identifying called parties. Accordingly, if the caller is identified in the origination blocking list, the SCP 58 generates a continue message (step 148) and the caller is denied access to the delivery service.

If the call satisfies all of the predetermined criteria utilized by the SCP 58, the SCP 58 outputs a send-to-resource message to the SSP 54 (step 140). This message causes the SSP 54 to present the messaging service announcement to the caller. The SCP 58 then waits until it receives a resource-clear message containing the callers response (step 142). In step 144, a check is made to determine whether the resource-clear message indicates that the call was answered or abandoned. If so, the SCP 58 terminates its actions regarding the message delivery service. If not, a check is made by the SCP 58 to determine whether the caller has selected the message delivering service (step 146). If not, the SCP 58 outputs the continue message (step 148). If so, the SCP 58 outputs an analyze-route message, causing the SSP 54 to connect the call to the SN/IP 56 (step 150).

Figure 8:
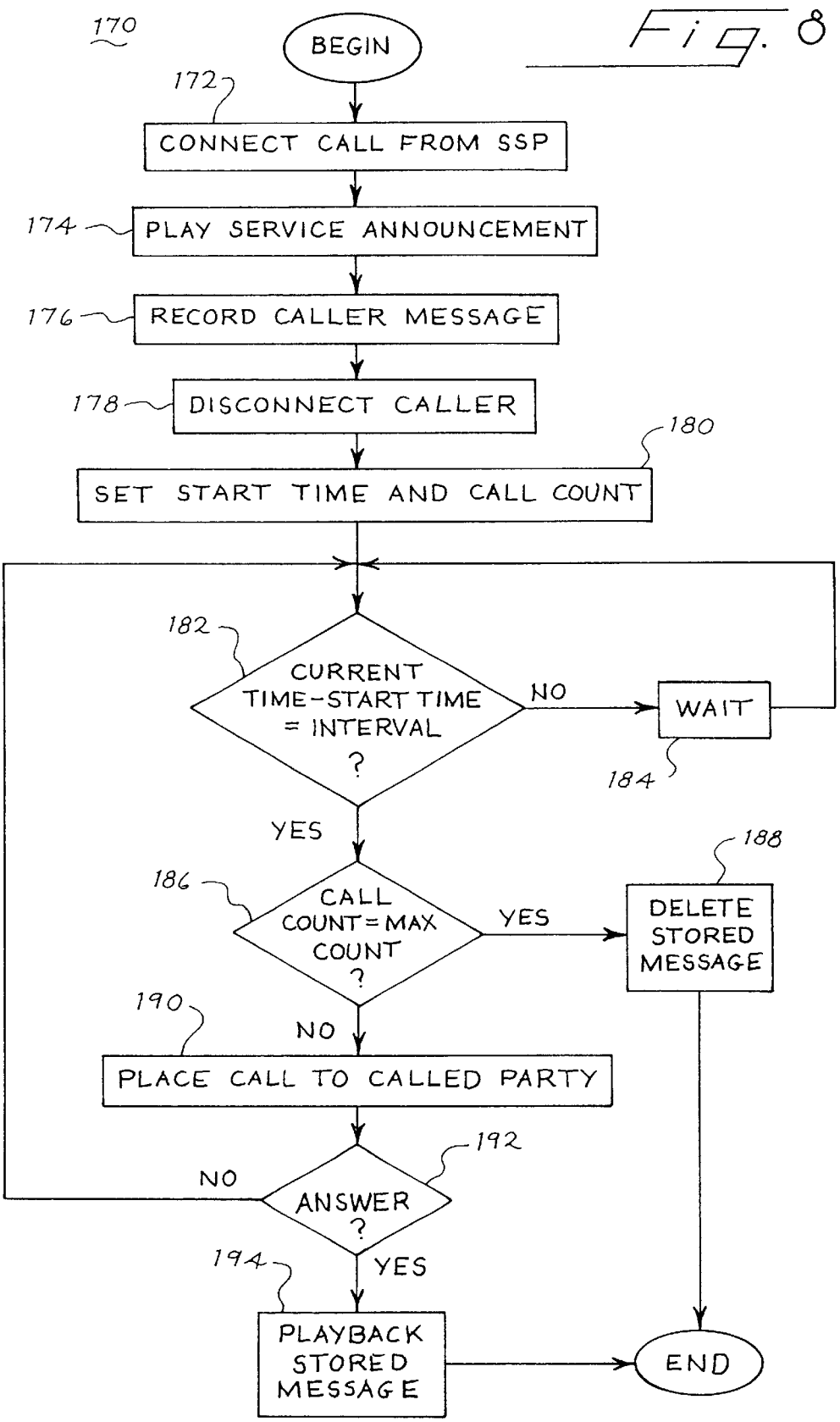
FIG. 8 shows a flowchart diagram illustrating a method of operating the service node/intelligent peripheral (SN/IP) of FIG. 2 in accordance with an embodiment of the present invention.

FIG. 8 depicts a flowchart illustrating a method 170 of operating the SN/IP 56 to provide the message delivery service. Under the delivery service, the SN/IP 56 commences operation when the SSP 54 connects the call thereto (step 172). After receiving a call from the SSP 54, the SN/IP 56 plays an audible service announcement describing the message delivery service and providing a number of options to the caller, such as message playback, editing, or deletion.

In step 176, the SN/IP 56 records and stores the caller's message. The message can include the caller's name and number as spoken by the caller. Alternatively, the recorded message can include caller-ID information automatically provided to the SN/IP 56 by the SSP 54. This information can be provided to a text-to-speech synthesizer (not shown) within the SN/IP 56 for audible delivery to the called party at a later time.

After the message is recorded, the caller is disconnected from the AIN (step 178). After the caller has been disconnected, the SN/IP 56 can set software variables representing a start time and a call count. These variables are used to determine the interval between calls placed by the SN/IP 56 to the called party and the number of attempts by the SN/IP 56 to reach the called party. In step 182, a check is made to determine whether the difference between the current time and the start time is equal to a predetermined interval defining the period between successive calls made by the SN/IP 56 to the called party. The current time can be provided by a conventional system clock provided within the SN/IP 56. If the interval has not elapsed, the message delivery service enters a temporary wait state (step 184) and then repeats the check of whether the interval has elapsed.

After the interval has elapsed, the call count is compared to a predetermined maximum call count. The maximum call count can be a programmable software variable indicating the maximum number of attempts by the SN/IP 56 to successfully complete a call to the called party. In the example shown, if the call count is equal to the maximum count, the SN/IP 56 has failed to deliver the stored message and, in turn, deletes the message (step 188). However, if the call count has not exceeded the maximum count, the SN/IP 56 places the message delivery call to the called party (step 190). The SN/IP 56 monitors the call to determine whether or not called party answers (step 192). If the party answers, the stored message is played back to the called party. The SN/IP 56 can be configured to provide playback options to the called party, such as playback repeat, message forwarding, message archiving, or the like. However, if the called party does not answer, the call count variable is incremented and a new successive interval is commenced and the method 170 returns to step 182.

The AIN elements, such as the SSP 54, the SCP 58, and the SN/IP 56, can be configured to accept an article of manufacture, such as a computer-readable medium that contains software components in accordance with an embodiment of the present invention. In sum, there has been disclosed herein a system and method that permits a telephonic message delivery service to be blocked by a called party. Because the system and method as disclosed herein can utilize a termination blocking list, it can permit a party to conveniently and transparently disable the service.

Obviously, many modifications and variations of the present invention are possible in light of the above teachings. Thus, it is to be understood that, within the scope of the appended claims, the invention may be practiced otherwise than as specifically described above.

What is claimed is:

1. A method for blocking a message delivery service that records a caller's message for subsequent delivery to a called party, the method comprising:
   receiving a call from a caller to a called party;
   determining if the called party is included in a blocking list that identifies a plurality of called parties who do not want a message delivery service to deliver caller messages to them; and
   if the called party is included in the blocking list, preventing the message delivery service from being offered to the caller.

2. The invention of claim 1 further comprising:
   if the called party is not included in the blocking list, offering the message delivery service to the caller.

3. The invention of claim 1 further comprising:
   receiving a request from the called party to be included in the blocking list; and
   adding the called party to the blocking list.

4. The invention of claim 3, wherein a service management system adds the called party to the blocking list.

5. The invention of claim 1, where in the act of determining is performed if the called party has not answered the call after a predetermined time.

6. The invention of claim 1, wherein the blocking list comprises caller-ID information of the called parties.

7. The invention of claim 1, wherein the blocking list comprises names of the called parties.

8. The invention of claim 1, wherein the blocking list comprises numbers of the called parties.

9. The invention of claim 1, wherein a service control point performs the determining and preventing acts.

10. A method for blocking a message delivery service comprising:
    providing a message delivery service that records caller information during a call from a caller to a called party and subsequently delivers the caller information to the called party by placing a call to the called party following the call from the caller to the called party; and
    providing a blocking list identifying a plurality of called parties who do not want the message delivery service to deliver caller messages to them; wherein the message delivery service is not offered to callers calling called parties included on the blocking list.

11. The invention of claim 10 further comprising:
    receiving a request from a party to be included in the blocking list; and
    adding the party to the blocking list.

12. The invention of claim 10, wherein the blocking list comprises caller-ID information of the called parties.

13. The invention of claim 10, wherein the blocking list comprises names of the called parties.

14. The invention of claim 10, wherein the blocking list comprises numbers of the called parties.

15. A telecommunication system comprising:
    a blocking list identifying a plurality of called parties who do not want a message delivery service to deliver caller messages to them; and
    a processor in communication with the blocking list, the processor providing a message delivery service that records a message from a caller to a called party and subsequently delivers the message to the called party if the called party is not identified in the blocking list.

16. The invention of claim 15, wherein the processor comprises a service control point.

17. The invention of claim 15 further comprising a service management system operative to add a party to the blocking list.

18. The invention of claim 15, wherein the blocking list comprises caller-ID information of the called parties.

19. The invention of claim 15, wherein the blocking list comprises names of the called parties.

20. The invention of claim 15, wherein the blocking list comprises numbers of the called parties.

* * * * *